United States Patent [19]
Strawser, Sr.

[11] Patent Number: 5,954,952
[45] Date of Patent: Sep. 21, 1999

[54] STORMWATER CATCH BASIN FILTER ASSEMBLY

[75] Inventor: Daniel M. Strawser, Sr., Grove City, Ohio

[73] Assignee: Alpine Stormwater Management Company, Grove City, Ohio

[21] Appl. No.: 09/015,947

[22] Filed: Jan. 30, 1998

[51] Int. Cl.⁶ ........................................................ E03F 5/06
[52] U.S. Cl. ........................ 210/164; 210/232; 210/337; 210/489
[58] Field of Search ....................... 210/163–166, 210/232, 463, 477, 314, 315, 335, 337, 339, 485, 489; 52/12; 404/4; 4/286, 292

[56] References Cited

U.S. PATENT DOCUMENTS

| | | |
|---|---|---|
| 1,711,674 | 5/1929 | Egan . |
| 3,881,832 | 5/1975 | Maguire . |
| 4,046,482 | 9/1977 | Paasch . |
| 4,594,157 | 6/1986 | McGowan . |
| 5,321,920 | 6/1994 | Sichel . |
| 5,405,539 | 4/1995 | Schneider . |
| 5,619,825 | 4/1997 | Leroney et al. . |
| 5,640,991 | 6/1997 | King . |
| 5,725,782 | 3/1998 | Chinn et al. . |
| 5,733,445 | 3/1998 | Fanelli . |

FOREIGN PATENT DOCUMENTS 2236132  3/1991  United Kingdom .

*Primary Examiner*—Jay H. Woo
*Assistant Examiner*—Fred Prince
*Attorney, Agent, or Firm*—Thomas S. Baker, Jr.

[57] ABSTRACT

A novel filter assembly for a drainage system stormwater curb and gutter-type catch basin is provided with spaced-apart frame elements that are joined to and carry a singular mesh fabric filter element, the mesh fabric filter element advantageously additionally functioning to hingedly interconnect the filter assembly frame elements into a unitary structure.

4 Claims, 3 Drawing Sheets

STORMWATER CATCH BASIN FILTER ASSEMBLY

CROSS-REFERENCES

None.

FIELD OF THE INVENTION

This invention relates generally to stormwater drainage systems, and particularly concerns an improved filter assembly that may be readily and advantageously incorporated into a stormwater drainage system catch basin having both curb and gutter type inlet openings.

BACKGROUND OF THE INVENTION

Increasingly it becoming necessary, in order to comply with applicable governmental environment regulations, to provide for adequate filtering of debris, silt, and the like from run-off stormwater prior to entry of that run-off water into the stormwater inlets of a constructed drainage system and subsequent flow to a natural drainage system. Such filtering is particularly necessary and important with respect to construction sites having hard-surfaced roadways that include conventional curb and gutter inlet openings in the one or more catch basins comprising a part of the stormwater drainage system.

Many different forms of filter devices have been proposed or offered for such applications but have generally been found to be either unnecessarily complex or difficult to utilize—particularly with respect to filter removal and replacement for maintenance cleaning. Many such filter device forms have required the prior removal of the usually very heavy cast metal drainage system inlet covers or grates in order to achieve proper filter installation. See for instance the disclosures of U.S. Pat. No. 4,594,157 granted to McGowan, and also U.S. Pat. No. 5,223,154 issued in the names of MacPherson, J. et al.

Other teachings of drainage system inlet filters requiring the removal of inlet covers or grates prior to installation or replacement of the silt and debris filter device include U.S. Pat. No. 5,405,539 issued to Schneider and U.S. Pat. No. 5,575,925 granted to Logue, Jr.

See also U.S. Pat. No. 5,403,474 granted to Emery for disclosure of a stormwater drainage system inlet filter that, while not requiring the prior removal of an inlet opening cover or grate prior to filter installation or replacement, does require the pre-installation manipulation of a metal mesh container filled with large and heavy volumes of gravel.

Another type of stormwater filter device for stormwater drainage system inlet openings is disclosed in U.S. Pat. No. 5,345,741 granted to Slater et al. and, although not requiring removal or replacement of an inlet opening grate or cover, is relatively complex and unnecessarily bulky compared to the invention described and claimed herein.

I have discovered that the shortcomings associated with such prior art may be readily overcome through the use of a novel construction of filter device for stormwater drainage system curb and gutter-type catch basin inlet opening applications. Other objects and advantages of the present invention will become apparent during a consideration of the descriptions and drawings which follow.

SUMMARY OF THE INVENTION

The stormwater system catch basin filter assembly of the present invention is basically comprised of a pair of spaced apart rectangular metal frame elements sized to be co-extensive in area with co-operating catch basin gutter inlet and curb inlet openings, a singular flexible silt and debris filter element secured to both metal frame elements and functioning as a hinge that connects the metal frame elements into a unitary structure, and clamps for removably securing the assembly to the frame and grate elements of the incorporating catch basin cover. Two different types of clamp devices for removably connecting the assembly to the catch basin inlet opening frame are disclosed.

DETAILED DESCRIPTION

Figure 1:
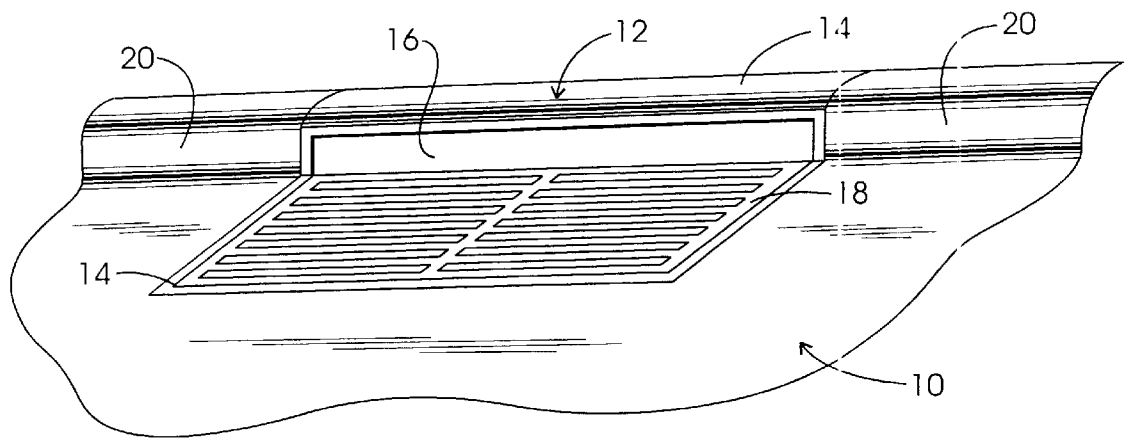
FIG. 1 is a perspective view of a conventional curb and gutter-type stormwater drainage system catch basin inlet opening.

FIG. 1 illustrates a portion of a typical prior art paved and crowned roadway 10 having a representative curb and gutter-type catch basin inlet cover 12 that essentially is comprised of a cast metal frame 14 having a curb inlet opening 16 and a gutter inlet opening that is covered by heavy-duty cast metal (usually a low carbon steel alloy) gutter grate 18 which is supported by frame 14. Stormwater run-off enters the stormwater drainage system that includes the catch basin by flow through opening 16 and through the openings of grate 18. Grate 18 and support portions of co-operating cast metal frame 14 are positioned so that their upper surfaces are flush with the paved surface of roadway 10. Also, cast metal frame 14 is provided with an inset curb stormwater inlet opening portion 16 that essentially lies within the plane of the vertical surface of curb portion 20 of roadway 10.

Figure 2:
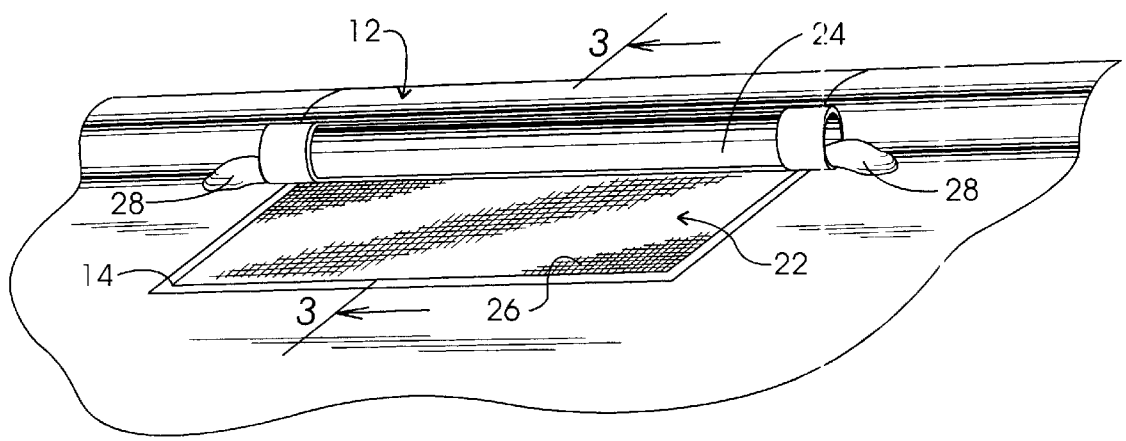
FIG. 2 illustrates a prior art silt and debris filter assembly positioned over the catch basin inlet opening cover of FIG. 1.
Figure 3:
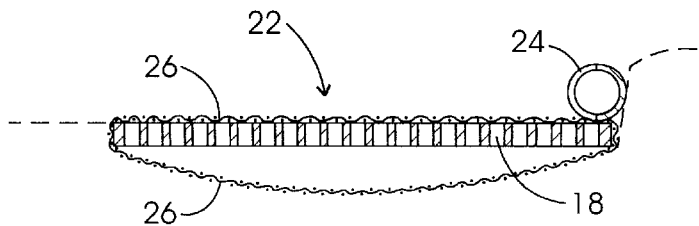
FIG. 3 is a section view taken at line 3—3 of FIG. 2.

In FIGS. 2 and 3 I illustrate details of a prior art stormwater catch basin filter assembly 22 that is comprised of a tube-shaped, dam-type mesh fabric filter element 24 and of a co-operating sleeve-type or endless mesh fabric filter element 26 which is slipped over and surrounds the catch basin grate element 18. Removable and reduced-size sand-bag elements 28 are partially inserted into the end openings of dam-type filter element 24 to removably retain that filter element it in its properly-installed position. As with respect to several of the prior art stormwater catch basin filter assemblies mentioned above, when installation, removal, or cleaning and replacement of filter element 26 is required or is desired, it becomes necessary to first remove catch basin cover grate element 18 from within its frame support 14 before such operations can be completed. Also, such operations typically involve difficult manipulation of the catch basin grate element in that representative catch basin cover cast metal grate elements often weigh in the range of from 125 pounds to as much as 500 pounds.

Figure 4:
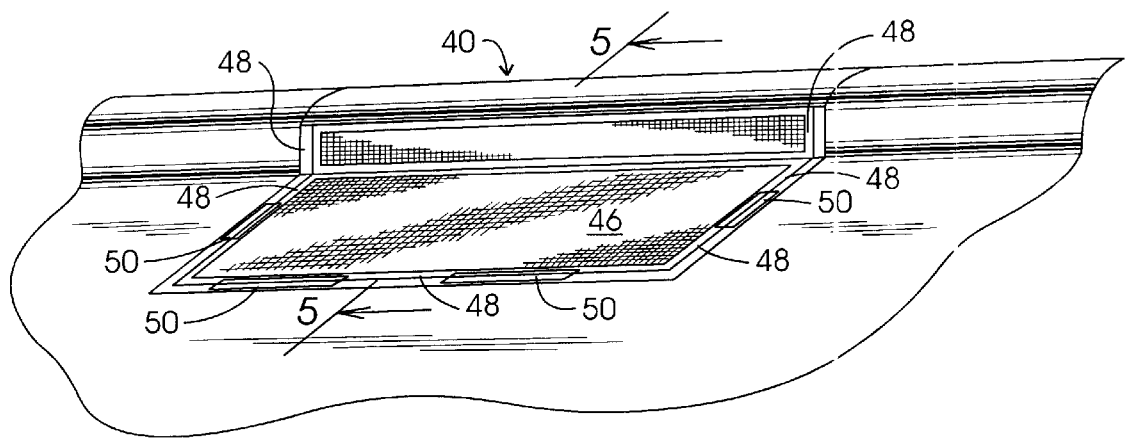
FIG. 4 is a perspective view of one embodiment of the stormwater catch basin filter assembly of the present invention combined with a representative conventional curb and gutter-type stormwater drainage system catch basin inlet cover.
Figure 5:
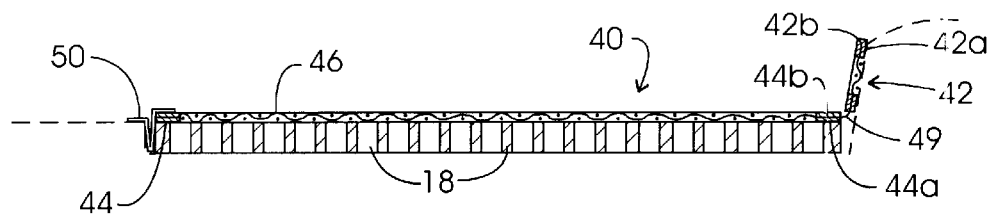
FIG. 5 is a section view taken at line 5—5 of FIG. 4.

In FIGS. 4 and 5 of the drawings I schematically illustrate a preferred embodiment 40 of the stormwater catch basin filter assembly of the present invention. Assembly 40 is essentially comprised of adjacent but spaced-apart rectangular filter frame elements 42 and 44 which support and carry singular mesh fabric filter element 46. (Note that such frame elements are actually comprised of a lower portion 42a or 44a and an upper portion 42b or 44b superimposed upon and fastened to its respective lower portion with the edge regions of filter element 46 clamped therebetween). Frame element 42 is essentially co-extensive in area with the area of curb inlet opening 16 of catch basin cover frame element 14; frame element 44 is essentially co-extensive in area with the overall upper surface of gutter inlet opening grate element 18. Rivets 48 (see FIG. 4) or other suitable fasteners are utilized to join the upper and lower portions of filter assembly frame element 42 and spaced-apart filter assembly frame element 44, and the mesh fabric filter element 46 sandwiched therebetween, into a unitary structure.

Since mesh fabric filter element 46 is preferably fabricated of relatively closely inter-woven polypropylene monofilaments, such filter element has substantial flexibility which permits it to function as an integrally-formed assembly hinge 49 in the region that separates spaced-apart frame elements 42 and 44. Lastly, assembly 40 also includes the several clamp elements 50 that removably secure frame element 44 to the catch basin cover by co-operation with catch basin cover frame element 14 and catch basin cover grate element 18. Details regarding alternate forms for such clamp elements 50 are provided in FIGS. 9 and 10 of the drawings.

Figure 6:
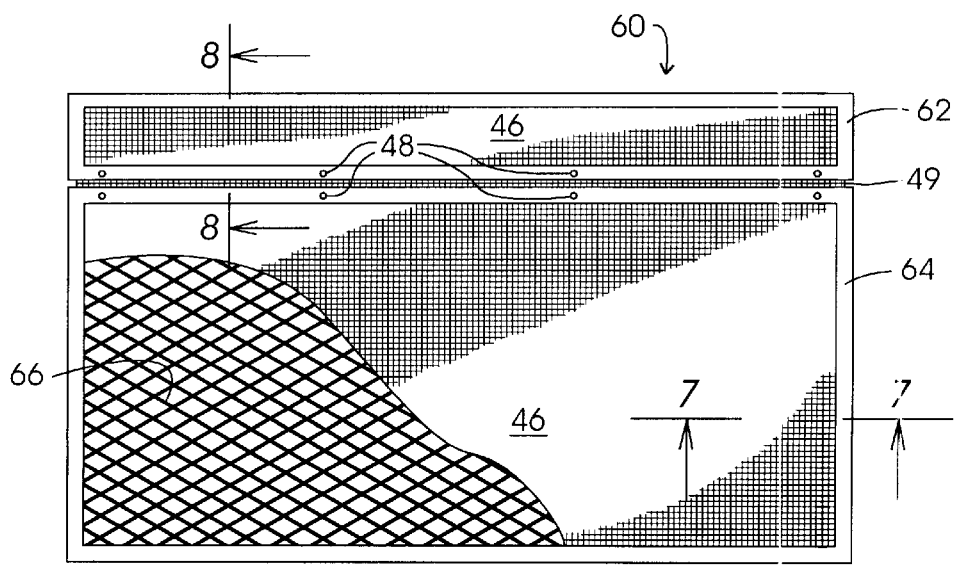
FIG. 6 is a plan view of another embodiment of the stormwater catch basin filter assembly of the present invention.
Figure 7:
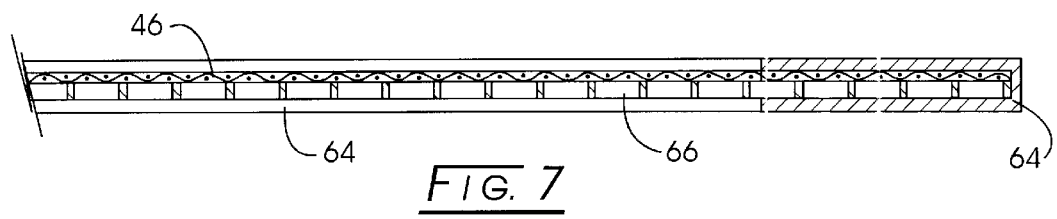
FIG. 7 is a section view taken at line 7—7 of FIG. 6.
Figure 8:
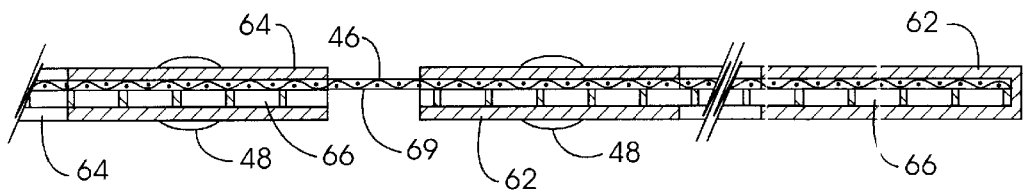
FIG. 8 is a section view taken at line 8—8 of FIG. 6.

In FIGS. 6, 7, and 8 I provide details of an alternate embodiment 60 of the stormwater catch basin filter assembly of the present invention that differs from the FIGS. 4 and 5 embodiment in the use of an expanded metal support element 66 for supporting mesh fabric filter element 46 in its installed condition within modified filter assembly frame elements 62 and 64. Assembly frame elements 62 and 64 are distinguished from elements 42 and 46 in that three of their sides are joined, have a U-shape planform, and function by securely clinching perimeter edges of mesh fabric filter element 46 and expanded metal support element 66 into a unitary structure. The remaining adjacent, straight, and spaced-apart sides of frame elements 62 and 64 are each comprised of an upper portion and a lower portion joined together by fasteners 48 in the manner of joinder of the upper and lower portions of assembly frame elements 42 and 44. See FIG. 8. As in the case of assembly embodiment 40, mesh fabric filter element 46 functions as an integral hinge 69 in its region situated intermediate frame elements 62 and 64.

Figure 9:
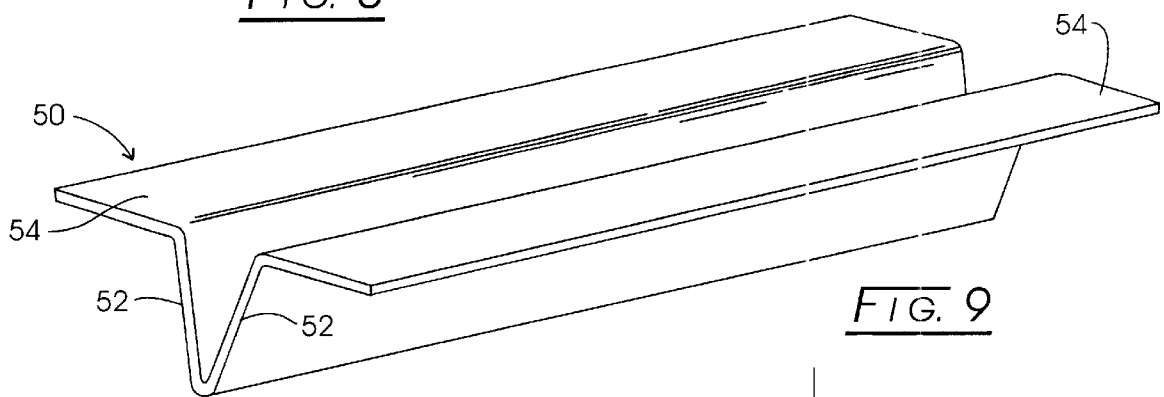
FIG. 9 is a perspective view of one form of fastening device for use with the stormwater catch basin filter assembly of the present invention.

In FIG. 9 I provide a perspective illustration of one form of the clamp elements 50 shown in FIGS. 4 and 5. Such clamp devices are each preferably made of a stainless steel sheet metal formed into the illustrated configuration which essentially has clamp leg elements 52 joined in a "V" cross-section configuration with integrally attached clamp flange elements 54. Clamp elements 50 are normally installed by forcefully driving leg elements 52 downward and into the catch basin inlet cover gap that exists between exterior edges of cover grate element 18 and cover frame element 14. Such clamp-driving operation is continued until clamp flanges 54 engage the upper surfaces of the cover frame and grate. Installed clamp devices 50 may be readily removed from frictional engagement with cover elements 14 and 18 by moderate upward prying forces applied by a hand tool between catch basin cover upper surfaces and clamp flange under surfaces.

Figure 10:
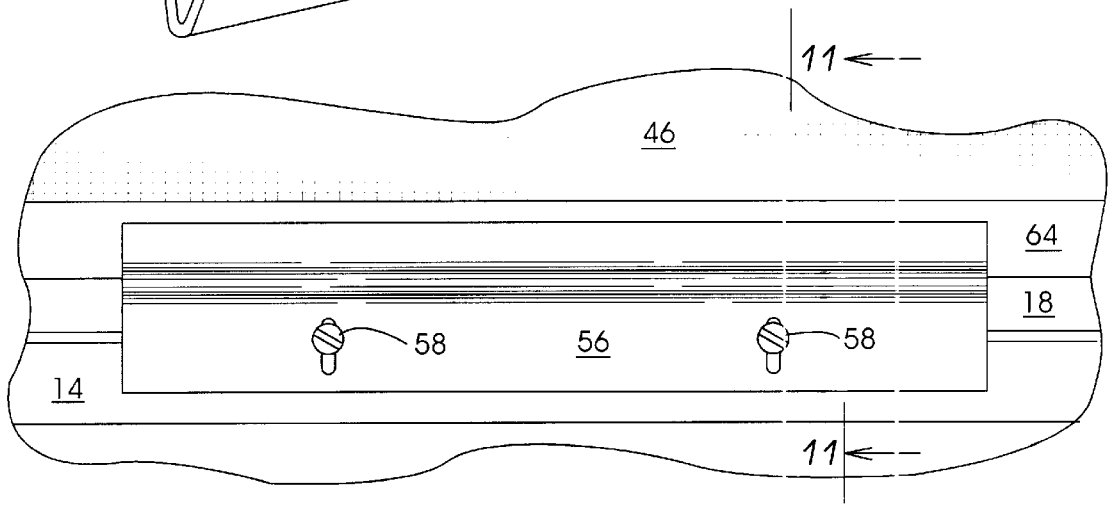
FIG. 10 is a partial plan view of another arrangement for securing the stormwater catch basin filter assembly of the present invention to a stormwater drainage system catch basin inlet opening cover.
Figure 11:
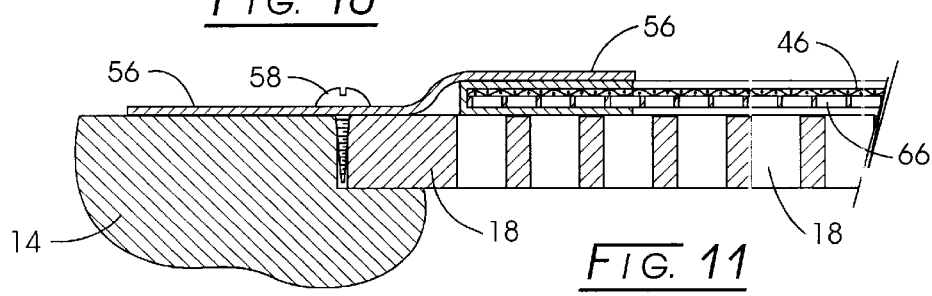
FIG. 11 is a section view taken at line 11—11 of FIG. 10.

Lastly, FIGS. 10 and 11 illustrate details of an alternate form of clamp device provided with the reference numeral 56. Clamp device 56 preferably is made of relatively thin strip stainless steel, has an integral and linearly-oriented offset, and is joined to catch basin cover elements 14 and 18 by the headed screw fastener 58 that engages the sides of the gap existing between an interior edge of cover frame element 14 and cover grate element 18 in a conventional screw fastener manner.

Various changes may be made with respect to the shapes, sizes, and construction materials of the disclosed elements of the stormwater catch basin filter assembly of the present invention without departing from the scope, meaning, or intent of the claims which follow.

I claim as my invention:

1. For combination with a stormwater catch basin having a cover frame, a cover gutter grate supported by the frame, and a cover curb inlet adjacent the grate, a catch basin filter assembly comprising:

a first open frame element having a plan area substantially co-extensive with the plan area of the stormwater catch basin cover gutter grate;

a second open frame element spaced-apart from said first open frame element and having a plan area substantially co-extensive with the plan area of the stormwater catch basin cover curb inlet;

a mesh fabric filter element connected to and carried by said first and second open frame elements and having a plan area substantially coextensive with the combined plan areas of said first and second open frame elements; and multiple clamp devices for removably connecting said first open frame element to the catch basin cover frame and to the catch basin cover gutter grate, said mesh fabric filter element functioning as a hinge connected to and positioned intermediate said first and second open frame elements.

2. The invention defined by claim 1 wherein said first and second open frame elements are each comprised of an upper frame portion and a lower frame portion of like configurations, each said upper frame portion being connected to a lower frame portion with an edge portion of said mesh fabric filter element being positioned therebetween.

3. The invention defined by claim 1, and further comprised of an expanded metal support element, said expanded metal support element having a planform area substantially co-extensive with the planform area of said first open frame element, and said expanded metal support element also being positioned in said first open frame element immediately beneath said mesh fabric filter element.

4. A stormwater curb and gutter-type catch basin installation in a drainage system, and comprising:

a catch basin inlet cover frame element having a substantially rectangular plan configuration;

a catch basin inlet cover gutter grate element supported by said catch basin inlet cover frame element;

a catch basin inlet curb opening element within said catch basin inlet cover frame element and contiguous to said catch basin inlet cover gutter grate element;

a filter assembly first open frame element positioned upon and supported by said catch basin inlet cover gutter grate element;

a filter assembly second open frame element positioned over said catch basin inlet curb opening element and hingedly connected to said filter assembly first open frame element;

a unitary mesh fabric filter element connected to and essentially co-extensive with said filter assembly first and second open frame elements; and multiple clamp elements removably connecting said filter assembly first open frame element to said catch basin inlet cover frame element and to said catch basin inlet cover gutter grate element, said filter assembly first and second open frame elements being hingedly interconnected by said unitary mesh fabric filter element.

* * * * *